C. E. PERKINS.
UNIVERSAL JOINT.
APPLICATION FILED JULY 3, 1915.
1,194,224.
Patented Aug. 8, 1916.
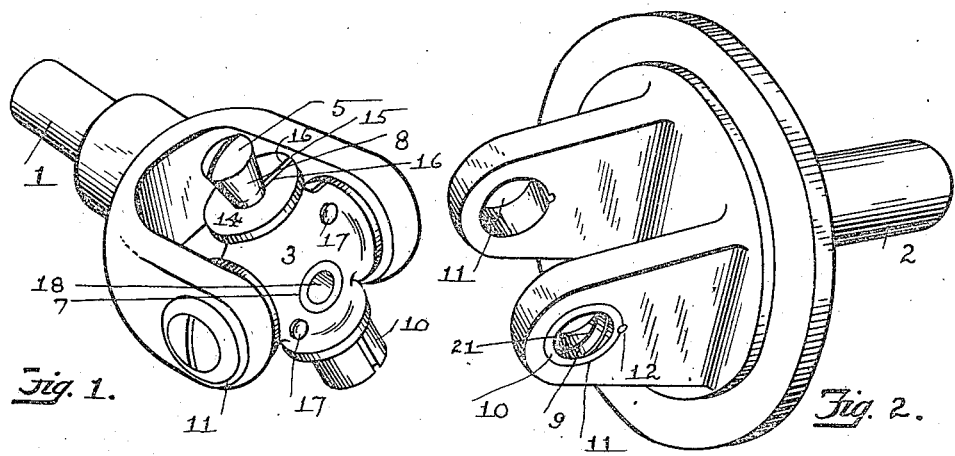
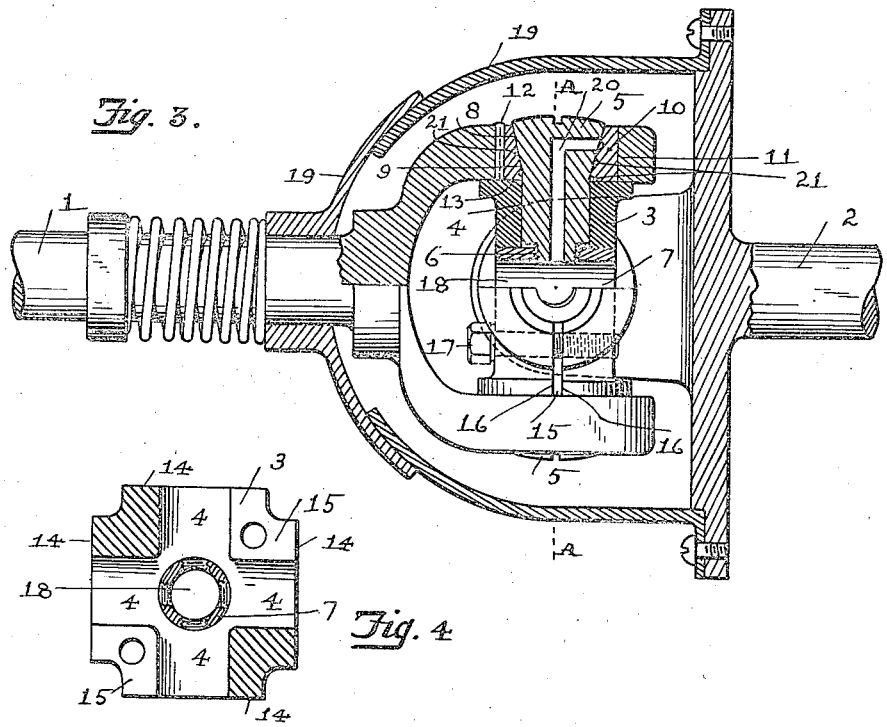
WITNESSES:
D. W. Bradford
Henrietta X. Vander Myde
INVENTOR.
Charles E. Perkins
BY Cyrus W. Rice
his ATTORNEY

UNITED STATES PATENT OFFICE.

CHARLES E. PERKINS, OF GRAND RAPIDS, MICHIGAN.

UNIVERSAL JOINT.

1,194,224. Specification of Letters Patent. Patented Aug. 8, 1916.

Application filed July 3, 1915. Serial No. 37,864.

*To all whom it may concern:*

Be it known that I, CHARLES E. PERKINS, a citizen of the United States, residing at Grand Rapids, in the county of Kent and State of Michigan, have invented new and useful Improvements in Universal Joints, of which the following is a specification.

My present invention relates to universal joints, such as are employed to connect rotatable shafts not alined; and its principal objects are to provide an improved joint of that character which shall have means for taking up the wear of its bearing parts; and further to provide improved means for lubricating such joints. These and any other objects appearing hereinafter, are attained by, and the invention finds preferable embodiment in, the structure hereinafter described and illustrated by the accompanying drawings, in which:

Figure 1 is a view in perspective of one of the shaft members and the connecting member of my universal joint; Fig. 2 is a like view of the other shaft member; these two figures showing the universal joint disassembled; Fig. 3 is a view of the universal joint assembled and provided with a lubricant-retaining casing, certain parts being shown in axial section; and Fig. 4 is a sectional view of the connecting member taken on a plane corresponding with line A—A of Fig. 3.

The rotatable shaft members 1 and 2, either of which may be the driven shaft, are connected by the connecting member 3. This connecting member rocks by means of suitable bearings on both shaft members. Preferably, such bearings are, as shown, identical as to both shaft members, and therefore such bearings in connection with one (either) shaft member only need be described. In the construction shown, the connecting member has two pairs of oppositely disposed sockets 4, one pair being arranged at right angles to the other pair, as particularly shown in Fig. 4. A pair of spindles 5 for each shaft member are held in each pair of sockets and are threaded in the connecting member at their inner ends 6—as in the wall of the hollow cylinder 7, seated in the center of the connecting member—whereby the spindles may be turned into longitudinally adjusted position for the purpose hereinafter set forth. These spindles have their outer portions 8 tapered inwardly, which portions rock in correspondingly shaped bearings 9 carried by the shaft members, a pair of such bearings on one shaft member for one pair of spindles and another pair on the other shaft member for the other pair of spindles. Preferably these bearings are in the cylindrical bearing blocks 10 movable in the sockets 11 of the shaft members axially, *i. e.* in the longitudinal direction of the spindle therein contained, and are splined at 12 against rotation. It will be seen that as these spindles are screwed down, the wear between their tapering portions and their bearings as well as that between the inner faces 13 of the bearing blocks and the outer faces 14 of the connecting member which bearingly engage with said blocks, is taken up. In order to hold the spindles in adjusted position the diagonally opposite portions of the connecting member are split at 15 into clamping parts 16, and screws 17 pass through one such part and are threaded in the other, whereby said parts may be drawn toward each other and held in clamping engagement with the spindles.

The connecting member has a lubricant passage 18 therein, through which lubricant in the joint casing 19 may pass; the spindles have passages 20 therein leading from the connecting member's passage to the spindles' bearing peripheries; the bearings 9 have helically-disposed grooves 21 into which the lubricant passes from the passages 20, and thence to the bearing surfaces of the blocks 10 and the connecting member.

As stated, the bearing connections between the connecting member and one shaft member are desirably identical with those between the connecting member and the other shaft member as shown; and the connections on the opposite sides of the connecting member between it and either one of the shaft members are desirably identical as shown; description of such connections as to one not being intended to exclude the same connections as to the other.

It will be seen that the turning of either oppositely disposed spindle will take up the wear without disturbing the alinement of the shaft.

The invention being intended to be defined solely by the claims, is not to be limited by details of construction shown or described.

I claim:

1. In a universal joint; shaft members; a connecting member therefor; oppositely disposed adjustable spindles threaded in the connecting member and having tapering portions; bearings on one shaft member corresponding with the spindles' tapering portions and in which such portions rock; and bearings in which the connecting member rocks on the other shaft member; the spindles having engaging portions extending outside the joint and adapted to be engaged by adjusting means.

2. In a universal joint; shaft members; a connecting member therefor; oppositely disposed spindles carried by the connecting member and having inwardly-tapering portions, one of said spindles being adjustably threaded in the connecting member; bearings on one shaft member in which the tapering portions of the spindles respectively rock; and bearings in which the connecting member rocks on the other shaft member.

3. In a universal joint; shaft members; a connecting member therefor; oppositely disposed spindles carried by the connecting member and having inwardly-tapering portions, one of said spindles being adjustably threaded in the connecting member; one shaft member having bearings in which the tapering portions of the spindles respectively rock; the bearing for one spindle being in a bearing block axially movable on said shaft member; and bearings in which the connecting member rocks on the other shaft member.

4. In a universal joint; shaft members; a connecting member therefor; two pairs of adjustable spindles threaded in the connecting member and having tapering portions, each pair being oppositely disposed; bearings on one shaft member in which one pair of spindles rock; bearings on the other shaft member in which the other pair of spindles rock, said bearings corresponding with and embracing the spindles' tapering portions; the diagonally-opposite portions of the connecting member being split into clamping parts; and screws adapted to hold said parts in clamping engagement with the spindles.

5. In a universal joint; shaft members; a connecting member therefor; oppositely disposed spindles carried by the connecting member and having tapering portions, one of said spindles being adjustably threaded in the connecting member; bearings on one shaft member in which the spindles respectively rock; a portion of the connecting member being split into clamping parts; a screw adapted to hold said parts in clamping engagement with the adjustable spindle; and bearings in which the connecting member rocks on the other shaft member.

6. In a universal joint; shaft members; a connecting member therefor having a lubricant passage therein; oppositely disposed spindles having bearing peripheries and carried by the connecting member and having lubricant passages therein leading from the connecting member's passage to the spindles' bearing peripheries; bearings on one shaft member in which the spindles respectively rock; and bearings in which the connecting member rocks on the other shaft member.

7. In a universal joint; shaft members; a connecting member therefor having a lubricant passage therein; oppositely disposed spindles carried by the connecting member and having lubricant passages therein leading from the connecting members' passage to the spindles' bearing peripheries; bearings on one shaft member in which the spindles respectively rock, and having in their bearing surfaces helically-disposed grooves for the lubricant communicating with the spindles' passages; and bearings in which the connecting member rocks on the other shaft member.

8. In a universal joint; shaft members; a connecting member therefor having a lubricant passage therein and bearing surfaces; oppositely disposed spindles carried by the connecting member and having lubricant passages therein leading from the connecting member's passage to the spindles' bearing peripheries; bearing blocks on one shaft member in which the spindles respectively rock, and axially movable on said shaft member, and bearing on the connecting member's said bearing surfaces, and having helically-disposed grooves for the lubricant communicating with the spindles' passages and leading to the connecting member's said bearing surfaces; and bearings in which the connecting member rocks on the other shaft member.

9. In a universal joint; shaft members; a connecting member therefor having bearing surfaces; oppositely disposed spindles carried by the connecting member and having tapering portions, one of said spindles being adjustably threaded in the connecting member; bearing blocks axially movable on one shaft member, and in which the tapering portions of the spindles respectively rock, and bearing on the connecting member's said bearing surfaces; and bearings in which the connecting member rocks on the other shaft member.

In testimony whereof I have hereunto set my hand in presence of three subscribing witnesses.

CHARLES E. PERKINS.

Witnesses:
CYRUS W. RICE,
D. W. BRADFORD,
HENRIETTA K. VANDER MYDE.